(12) United States Patent
Reese et al.

(10) Patent No.: US 8,894,027 B2
(45) Date of Patent: Nov. 25, 2014

(54) MULTI-ANGLE AND MULTI-POSITION REPROGRAPHIC COPY STAND

(75) Inventors: Jack Reese, Lindon, UT (US); Shawn Reid, Orem, UT (US)

(73) Assignee: Ancestry.com Operations Inc., Provo, UT (US)

( * ) Notice: Subject to any disclaimer, the term of this patent is extended or adjusted under 35 U.S.C. 154(b) by 553 days.

(21) Appl. No.: 13/075,565

(22) Filed: Mar. 30, 2011

(65) Prior Publication Data
US 2012/0248280 A1 Oct. 4, 2012

(51) Int. Cl.
A47G 1/17 (2006.01)

(52) U.S. Cl.
USPC .............. 248/206.5; 248/309.4; 248/448; 248/683; 358/474; 382/154

(58) Field of Classification Search
USPC ............ 382/154; 345/419, 427; 356/12; 248/448, 463, 464, 447, 460, 206.5, 248/309.4, 683
See application file for complete search history.

(56) References Cited

U.S. PATENT DOCUMENTS

| | | | | |
|---|---|---|---|---|
| 529,442 A * | 11/1894 | Gilman | ......................... | 248/448 |
| 1,202,345 A * | 10/1916 | Wigginton | ................... | 29/237.5 |
| 1,923,318 A * | 8/1933 | Lloyd | ........................... | 248/448 |
| 5,377,946 A * | 1/1995 | Pannu | ........................... | 248/456 |
| 7,639,406 B1 * | 12/2009 | Proudfoot et al. | ............ | 358/474 |
| 7,660,458 B1 * | 2/2010 | Saric | ............................. | 382/154 |
| 8,072,650 B1 * | 12/2011 | Starns et al. | .................. | 358/447 |
| 2009/0199526 A1 * | 8/2009 | Wallace | .......................... | 55/493 |
| 2011/0260020 A1 * | 10/2011 | Isserow et al. | ............. | 248/205.3 |

* cited by examiner

*Primary Examiner* — Amy J Sterling
(74) *Attorney, Agent, or Firm* — Kilpatrick Townsend & Stockton LLP

(57) ABSTRACT

Various methods and devices involving reprographic copy stands are described. A reprographic copy stand may include a first support element configured to support a first cover of a book at a first plurality of angles. The reprographic copy stand may also include a second support element configured to support a second configured to support a second cover of the book at a second plurality of angles. The reprographic copy stand may include a platform configured to couple with the first support element at a first plurality of positions and the second support element at a second plurality of positions. The distance between the support elements may be variable according to the position of the first support selected from the first plurality of positions and the position of the second support selected from the second plurality of positions such that a plurality of book binding thicknesses are accommodated by the distance.

7 Claims, 9 Drawing Sheets

MULTI-ANGLE AND MULTI-POSITION REPROGRAPHIC COPY STAND

BACKGROUND OF THE INVENTION

For centuries, books have been used to store information. While books have proven reliable for storing information, such as text and pictures, for long periods of time, books can be damaged through use. Damage to books through use, through actions such as opening the book, closing the book, and turning pages of the book, may be especially pronounced for old books and books with a large number of pages.

FIG. 1 illustrates a book 100 opened on a horizontal surface 110. When book 110 is opened on horizontal surface 120, a front cover 130 and a back cover 140 of book 110 may rest on horizontal surface 120. Opening book 100 such that front cover 130 and back cover 140 rest on horizontal surface 120 may be referred to as opening book 100 to 180°. Having book 100 in such position may place a significant amount of stress on bookbinding 150 (also referred to as the book's binding). If book 100 is old and/or contains a large number of pages, the stress placed on bookbinding 150 by opening book 100 to 180° may be sufficient to permanently damage book 100.

Besides potentially damaging the book, opening the book to 180° may be prohibited by the book's owner. For example, some archives and libraries may not permit rare, old, fragile, and/or special collection books to be opened to such a position due to the risk of damage to the bookbinding.

BRIEF SUMMARY OF THE INVENTION

Systems, devices, and methods are directed to reprographic copy stands. A reprographic copy stand may be present that includes: a first support element configured to support a first cover of a book at a first plurality of angles; and a second support element configured to support a second configured to support a second cover of the book at a second plurality of angles. The reprographic copy stand may also include a platform configured to couple with the first support element at a first plurality of positions and the second support element at a second plurality of positions. A distance between the first support element and the second support element may be variable according to the position of the first support selected from the first plurality of positions and the position of the second support selected from the second plurality of positions such that a plurality of book binding thicknesses are accommodated by the distance.

In some embodiments, first support element and the second support element couple with the platform via magnetic coupling. The platform may be configured to couple with the first support element and the second support element such that the first support element and second support element linearly align. The reprographic copy stand may include a number of magnets coupled with the platform that cause the first support element to couple with the platform at the first plurality of positions and the second support element to couple with the platform at the second plurality of positions.

The reprographic copy stand may include a vertical support element that extends vertically away from the platform; and a camera mount coupled with the vertical support element such that a camera coupled with the camera mount aims at the platform. The text of a book that is open and supported by the first support element, second support element, and the platform may be imaged by the camera such that text in an image is linearly aligned. The reprographic copy stand may include a first magnetic angle support configured to support the first support element at the first plurality of angles; and a second magnetic angle support configured to support the second support element at the second plurality of angles. When a book is seated on the first support element and the second support element, the book's binding may be fully supported by the platform. The reprographic copy stand may include a light emitting device coupled with the vertical support element, wherein light projected by the light emitting device defines at least a portion of a field of view of a camera.

In some embodiments, a method for supporting a book may be presented. The method may include setting a first support element to a first angle, wherein the first angle is selected from a first plurality of angles. The method may include setting a second support element to a second angle, wherein the second angle is selected from a second plurality of angles. The method may also include coupling the first support element to a platform in a first position selected from a first plurality of predefined positions. The method may include coupling the second support element to the platform a distance from the first support element in a second position selected from a second plurality of predefined positions. The distance between the first support element and the second support element may be selected according to a thickness of a book binding of the book to be supported. The method may include supporting the book using at least the first support element and the second support element. The first support element may support a first cover of the book at the first angle. The second support element may support a second cover of the book at the second angle. A surface of the platform between the first support element and the second support element may support the book binding of the book.

The first plurality of angles may be a first plurality of predefined angles, and the second plurality of angles may be a second plurality of predefined angles. Coupling the first support element to the platform in the first position selected from the first plurality of predefined positions and coupling the second support element to the platform the distance from the first support element in the second position selected from the second plurality of predefined positions may result in the first support element and second support element being linearly aligned. A number of magnets may be used to linearly align the first support element and the second support element. The method may further include positioning a camera coupled with a vertical support a distance away from the platform, wherein the camera is aimed at the platform. The method may include capturing, using the camera, an image of the book such that the image is linearly aligned. Positioning the camera may include using light projected from a device coupled with the vertical support, wherein the light defines at least a portion of a field of view of the camera. In some embodiments, the method includes repulsing the first support element from a first prohibited position of a first plurality of prohibited positions; and repulsing the second support element from a second prohibited position of a second plurality of prohibited positions.

An apparatus for supporting a book may be presented. The apparatus may include a first means for supporting a first cover of the book at a first angle, wherein the first angle is selected from a first plurality of angles. The apparatus may include a second means for supporting a second cover of the book at a second angle, wherein the second angle is selected from a second plurality of angles. The apparatus may include a third means that couples with the first means in a first position selected from a first plurality of predefined positions and couples with the second means in a second position selected from a second plurality of predefined positions. The third means may couple with the first means and the second means such that a distance between the first means and second means is present. The distance may vary based on the first position selected from the first plurality of predefined positions and the second position selected from the second plurality of predefined positions. The distance between the first means and the second means may be determined according to a thickness of a book binding of the book being supported, such that the book binding will be supported by the third means.

DETAILED DESCRIPTION OF THE INVENTION

Figure 1:
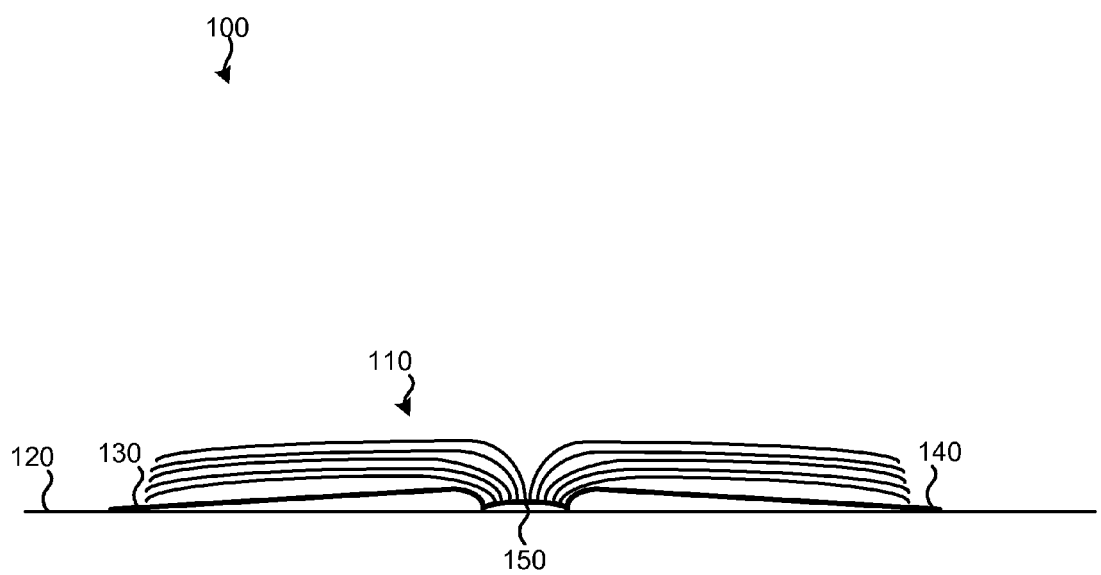
FIG. 1 illustrates an embodiment of a book lying open 180° on a horizontal surface.

In order to open a book and view information presented on the book's pages without opening the book 180° (and possibly damaging the bookbinding), a reprographic copy stand may be used. A reprographic copy stand may be positioned to prevent a book from opening greater than some angle, such as 90° or 135°. Further, a reprographic copy stand may be able to accommodate books of varying widths, lengths, and bookbinding thicknesses.

Besides preventing the book from opening up beyond a certain angle, a reprographic copy stand may be used to align the book for an image of one or more pages of the book to be captured such that information on the pages of the book is linearly aligned within the image. Imaging may be useful when information contained in the book is desired to be digitized. In order to facilitate processing of the images captured of the pages of the book, it may be useful for the information on the pages (e.g., the text and pictures) to be linearly aligned in the image with little or no skewing.

Some embodiments presented herein describe reprographic copy stands that accommodate a variety of angles to support a book open and also accommodate a variety of different bookbinding thicknesses. The elements of the reprographic copy stand that support the front cover of the book and the back cover of the book may be adjusted to support the book at a variety of angles. These elements may be moved a variety of distances apart to accommodate bookbindings of varying thicknesses. Therefore, as the support elements are moved apart, different bookbinding thicknesses may be accommodated. Such a reprographic copy stand may allow for a book's front cover, the book's back cover, and the book's bookbinding to be supported while the book is open. Such support may prevent or reduce damage to the book from use.

The available positions of the support elements of the reprographic copy stand that support the front cover of the book and the back cover of the book may be predefined. Other positions of the elements of the reprographic copy stand may be prohibited such that the support elements are prevented from entering these positions (or do not remain in these positions). By only allowing predefined positions, a desired orientation of a book placed on the reprographic copy stand may be maintained. For example, if the reprographic copy stand includes a vertical support on which a camera may be mounted, only allowing the support elements into predefined positions may ensure text and images of a book supported by the reprographic copy stand are linearly aligned and not skewed in an image taken by the camera.

Magnets may be used to set the elements into only predefined positions and/or to select an angle that the front cover and/or the back cover of the book is supported at. Magnets may be attached to the support elements such that an angle support may only be set to certain predefined locations. Similarly, a support element may only be set to predefined locations on a platform based on the attraction and repulsion of magnets. Such magnets may be used to ensure that the support element supporting the front cover of the book and the support element supporting the back cover of the book remain aligned in a linear arrangement to prevent skewing in an image taken by a camera. Further, magnets may allow for the angle and position of the support elements to be quickly adjusted. The use of magnets may allow the support elements to be moved to between different positions and angles by applying force to various parts of the support elements without manipulation of any other form of detent. Moreover, the use of magnets may preclude the need for any sort of detents or obstructions on the platform. Therefore, the user of magnets may allow the area available to support a book binding to be completely or almost completely flat.

Attached with the vertical support may be a mount that may attach with a camera or some other imaging device. The mount may be positioned such that text and/or pictures imaged by the camera of a book supported by the support elements are horizontally aligned (with no skewing). Also, attached with the mount, a field of view illumination device may be present. Such an illumination device may project light onto the support elements and/or platform of the reprographic copy stand (and book, if present). The projected light may outline or illuminate (collectively referred to as "define") an area that is within the camera's field of view. Therefore, by examining the area defined by the light emitted by the field of view illumination device, it may be determined where the camera should be positioned on the vertical support in order to properly image the book's contents.

Figure 2:
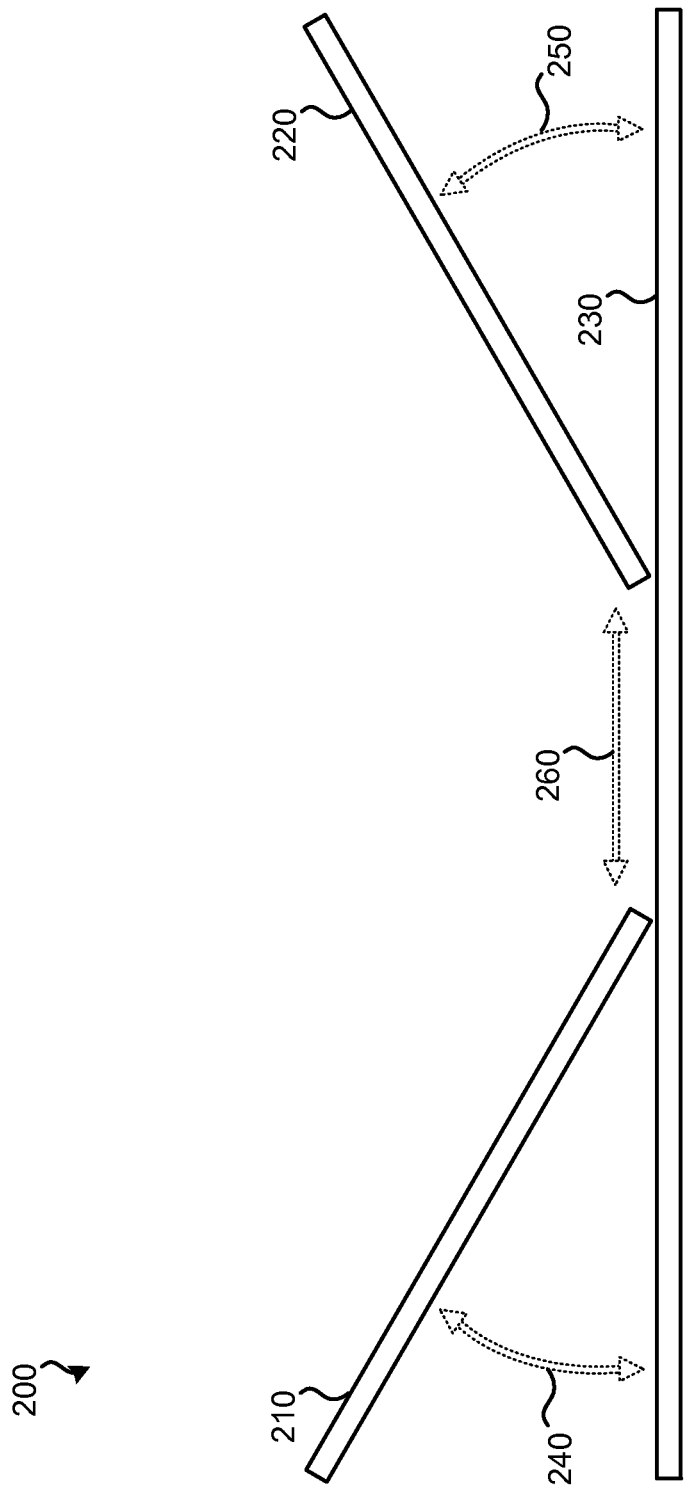
FIG. 2 illustrates an embodiment of a reprographic copy stand viewed from a side.

FIG. 2 illustrates an embodiment of a reprographic copy stand 200 viewed from a side. Reprographic copy stand 200 may include a first support element 210, a second support element 220, and a platform 230. First support element 210, second support element 220, and platform 230 may be made out of a rigid or semi-rigid material, such as metal, plastic, or wood.

Angle 240, represented by a dotted arrow, may represent the angle that support element 210 is set to support a cover of a book. Therefore, as angle 240 is increased, a book placed on reprographic copy stand 200 will remain closer to being shut. Similarly, angle 250, also represented by a dotted arrow, represents the angle that second support element 220 is set to support the other cover of the book. As angle 250 is increased, the book placed on reprographic copy stand 200 will also be closer to being shut. In some instances, angle 240 and angle 250 may have the same magnitude. In other instances, angle 240 may have a greater or smaller magnitude than angle 250.

Distance 260, represented by a dotted arrow, may represent a distance that may be varied between support element 210 and support element 220. Distance 260 may allow for books of varying bookbinding thicknesses to be fully supported against platform 230 (with no airspace below the bookbinding). For example, a book placed on reprographic copy stand 200 may have its front cover supported by support element 210, it's back cover supported by support element 220, and it's bookbinding supported by platform 230, wherein a portion of platform 230 supports the bookbinding by the first support element 210 and the second support 220 being separated from each other by distance 260. A thicker bookbinding would require distance 260 to be increased, while a thinner bookbinding would require distance 260 to be decreased.

Figure 3:
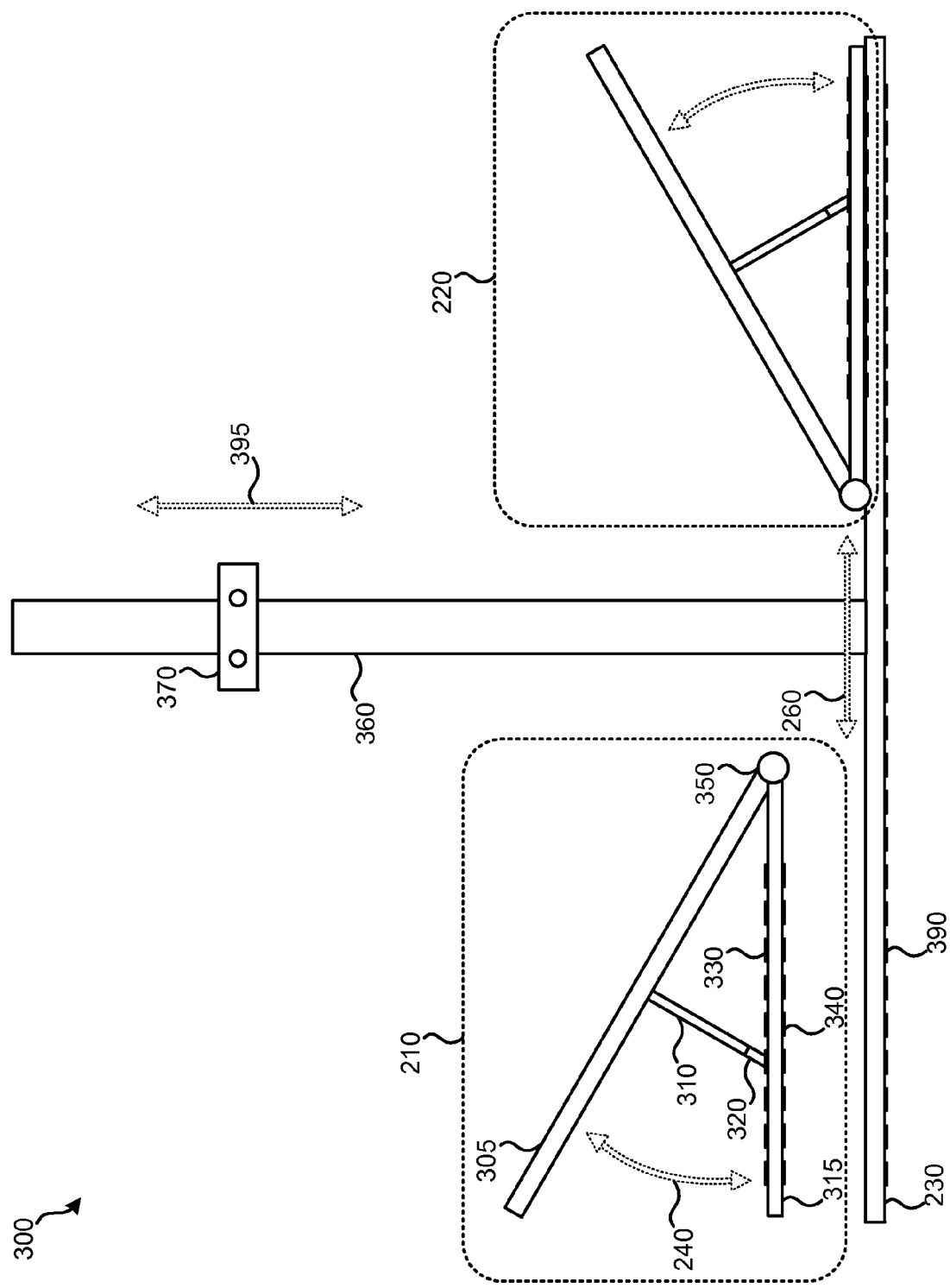
FIG. 3 illustrates another embodiment of a reprographic copy stand viewed from a side.

FIG. 3 illustrates another embodiment of a reprographic copy stand 300 viewed from a side. Reprographic copy stand 300 may represent reprographic copy stand 200 of FIG. 2, or may represent some other reprographic copy stand. Reprographic copy stand 300 may include: support element 210, support element 220, cover support 305, angle support 310, support base 315, magnet 320, first set of magnets 330, second set of magnets 340, hinge 350, vertical support 360, mount 370, platform 230, and platform magnets 390.

Support element 210 may represent support element 210 of FIG. 2. Support element 210 may include various components: cover support 305, angle support 310, magnet 320, hinge 350, support base 315, first set of magnets 330, and second set of magnets 340. Cover support 305 may be a flat or semi-flat component configured to support either the front or back cover of a book placed on reprographic copy stand 300. (Of course, if the book does not have a cover, cover support 305 may support whatever the first or last page of the book is present.) Cover support 305 may be longer and/or wider or shorter and/or narrower than the cover of the book being supported. When a book is placed on reprographic copy stand 300, a front or back cover of the book may contact cover support 305 in multiple locations. For example, cover support 305 may contact the cover of the book evenly over all or a portion of the book's cover.

Cover support 305 may be connected with angle support 310. Angle support 310 may be adjusted by a user to determine the angle at which cover support 305 is held. Angle support 310 may be connected with cover support 305 using a hinge or some other device to allow angle support 310 to change angle 240. Angle support 310 may be attached with magnet 320. Magnet 320 may allow angle support 310 to be set to various predefined positions. Magnet 320 may connect with other magnets or pieces of metal. These magnets may be referred to as first set of magnets 330.

First set of magnets 330 may be magnets that magnet 320 can couple with. First set of magnets may be attached with support base 315, which may be the lower piece of support element 210. First set of magnets 330 and magnet 320 may prevent angle support 310 from being set to an angle not associated with a magnet of first set of magnets 330. In some embodiments, first set of magnets 330 is a single magnet (or piece of metal) with various segments of first set of magnets 330 obstructed. This may be accomplished by a non-magnetic material (e.g., aluminum) being using to obstruct portions of a single magnet to serve as first set of magnets 330. As angle support 310 and magnet 320 are moved between different magnets of first set of magnets 330, the angle of cover support 305 will either increase or decrease. Angle 240 may be selected based on how far open a user wishes to open the book and/or the limitations set by the owner of the book. Hinge 350 may allow angle 240 to be adjusted while cover support 305 remains attached to support base 315.

Support element 220 may perform the same function as support element 210 for the opposite cover of a book (or whatever the first or last page of the book is). Angle 250 may have the same magnitude as angle 240 or may have a different magnitude depending on the position angle support 310 is in. Support element 220 is shown positioned on platform 230. Support element 210 is shown elevated from platform 230; this is for illustration only. When supporting a book, support element 210 may be positioned as support element 220 is: resting on platform 230.

Platform 230 may be attached with one or more magnets, referred to as platform magnets 390. Platform magnets 390 may be set of magnets, or a single magnet that is partially obstructed by pieces of material that are non-magnetic, such as aluminum, such that the single magnet behaves similarly to a set of magnets. Platform magnets 390 may be configured to couple with second set of magnets 340. Platform magnets 390 and second set of magnets 340 may couple in only particular, predefined locations, and may repulse in others. This may cause support element 210 to remain properly oriented with support element 220, such that a book placed on reprographic copy stand 300 will remain properly oriented with mount 370 to reduce or eliminate skewing in an image taken by a camera attached with vertical support 360. Platform magnets 390 and second set of magnets 340 may allow support element 210 to be positioned closer and further from support element 220 at predefined locations dictated by the attraction and repulsion of platform magnets 390 and second set of magnets 340. Further, these magnets may ensure that support element 210 remains properly aligned such that an image taken from a camera attached to mount 370 will not be skewed.

Similar to support element 210, support element 220 may have a second set of magnets that attaches and repulses from platform magnets. These magnets may ensure that that support element 220 remains properly aligned with support element 210 such that an image taken from a camera attached with mount 370 is not skewed. By moving support element 210 and support element 220 towards and away from each other, distance 260, which allows for bookbindings of various thicknesses to be accommodated, may be adjusted. A bookbinding may rest on the exposed portion of platform 230 between support element 210 and support element 220.

Vertical support 360 may be connected with platform 230. Attached to vertical support 360 may be mount 370 that may move vertically along vertical support 360, as illustrated by dotted arrow 395. A camera, or other imaging device, attached to mount 370 may be aligned with a book placed on reprographic copy stand 300 such that no skewing in an image of the book occurs because platform magnets, in combination with second set of magnets 340 and second set of magnets 345 properly align the book.

While reprographic copy stand 300 uses magnets to set angle support 310 and the position of support elements 210 and 220 on platform 230, it should be understood by those with skill in the art, that other embodiments may not rely on magnets. For example, in some embodiments, notches or cutouts in platform 230, support element 210, and support element 220 may be used in place of magnets.

Figure 4:
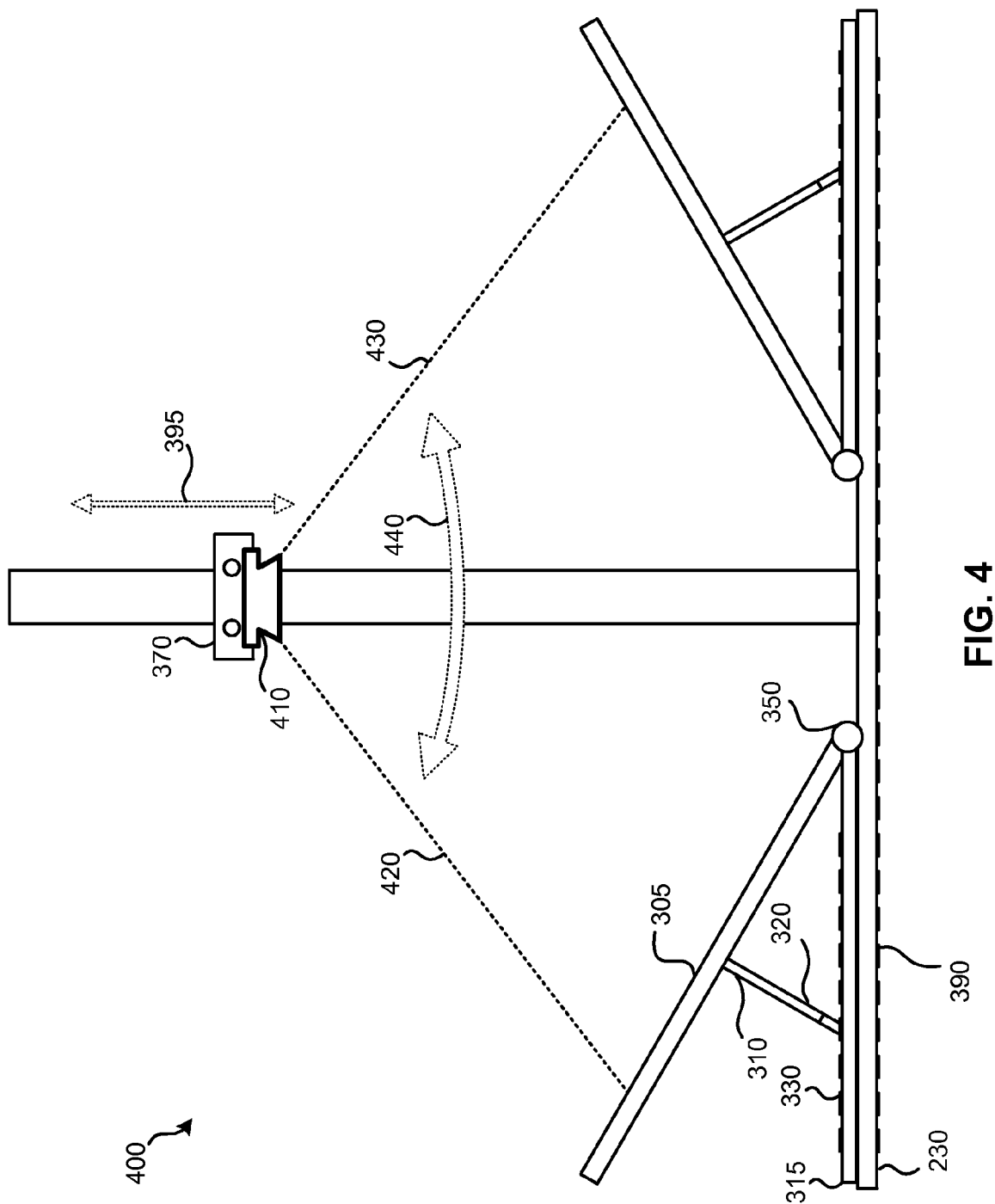
FIG. 4 illustrates an embodiment of a reprographic copy stand with a field of view illumination device.

FIG. 4 illustrates an embodiment of a reprographic copy stand 400 with a field of view illumination device. Reprographic copy stand 400 may represent the same reprographic copy stand as reprographic copy stand 300 of FIG. 3, or reprographic copy stand 200 of FIG. 2. Reprographic copy stand 400 may also represent some other embodiment of a reprographic copy stand. Reprographic copy stand 400 may contain the same components as reprographic copy stand 300 of FIG. 3, such as cover support 305, angle support 310, support base 315, magnet 320, first set of magnets 330, hinge 350 and platform magnets 390 (the second set of magnets 340 are hidden from view in FIG. 4). Additionally, reprographic copy stand 400 may include a field of view illumination device 410 ("FOVID"). FOVID 410 may emit light that illuminates a portion of a book placed on reprographic copy stand 400 and/or portions of reprographic copy stand 400. The light emitted by FOVID 410 may define the field of view of a camera attached to mount 370 such that an image captured by the camera attached to mount 370 will contain some or all of the area illuminated by FOVID 410.

Light emitted by FOVID 410 may be in the form of an outline, such that the area within the outline will be captured in an image taken by a camera attached to mount 370. The light emitted by FOVID 410 may also be a solid area of light, such that the area illuminated by the light will be captured in an image taken by a camera attached to mount 370. As mount 370 is moved toward and away from platform 230, the area either outlined or illuminated by FOVID 410 may contract or expand, respectively. Of course, other patterns of light may also be used.

Dotted line 420 and dotted line 430 illustrate the outer boundaries illuminated by FOVID 410. Lines 420 and 430 may represent light emitted by FOVID 410 or may represent the outer edge of the area illuminated by FOVID 410. Angle 440 (represented by a dotted arrow) may represent the angle of light emitted by FOVID 410. Based on the lens attached to the camera mounted on mount 370, the field of view of the camera may change. FOVID 410 may be adjusted to adjust angle 440 such that the light emitted by FOVID 410 accurately represents the field of view of the camera if the lens of the camera or the camera itself is changed.

Using such light to illuminate or outline the field of view of the camera on a book may preempt the need for a user to look through the camera's viewfinder or look at a display on the camera to determine what is being captured in images taken by the camera. This may allow pages of books to be imaged quicker and more efficiently.

Figure 5:
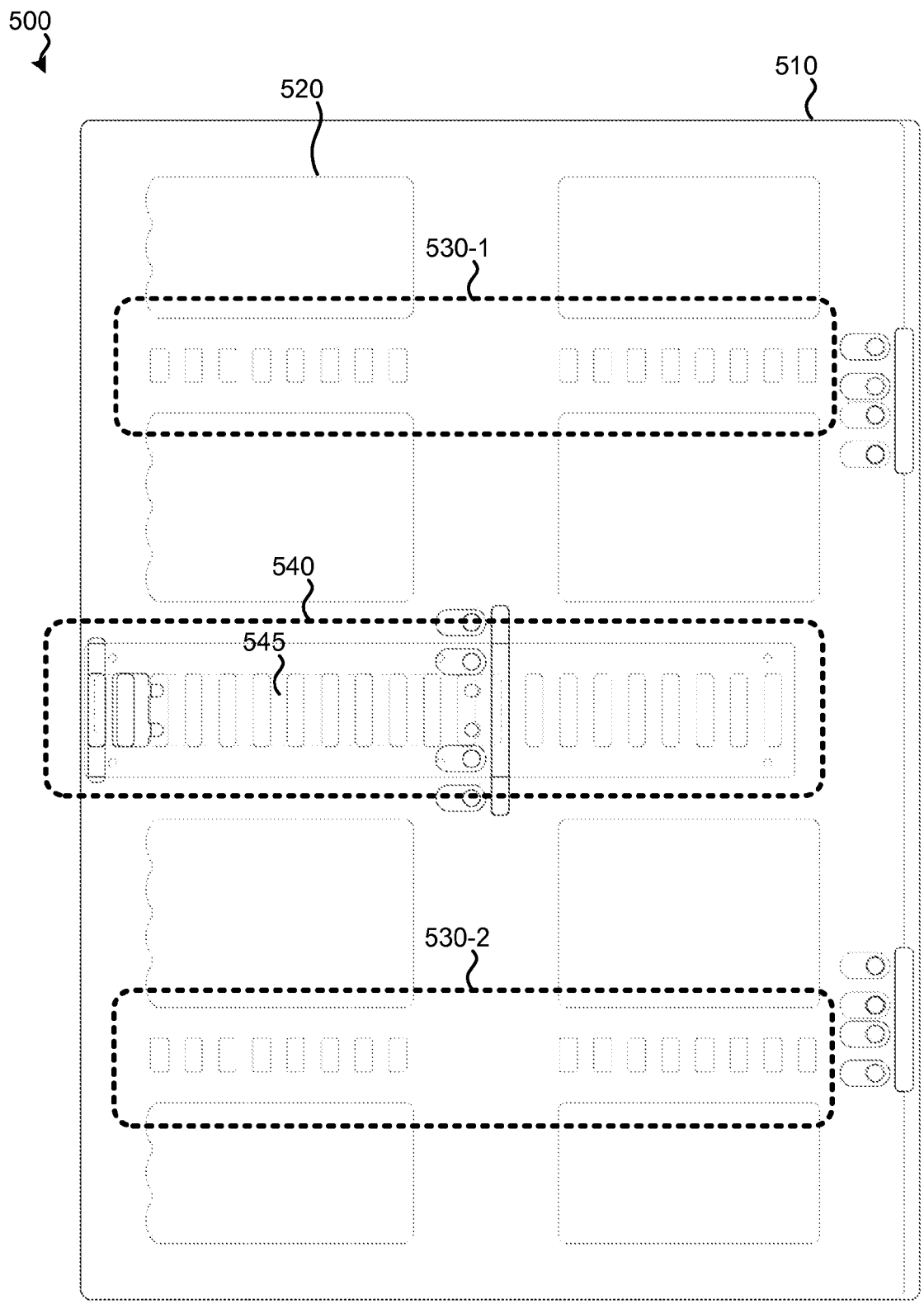
FIG. 5 illustrates an embodiment of a support element for a reprographic copy stand viewed from above.

FIG. 5 illustrates an embodiment of a support base 500 of a support element for a reprographic copy stand viewed from above. Support base 500 may represent support base 315 of FIG. 3, or may represent some other support base. Support base 500 may include frame 510, window 520, first set of magnets 540, and second set of magnets 530 (which includes second subset of magnets 530-1 and second subset of magnets 530-2).

Frame 510 may represent a flat piece of material, such as wood, plastic, or metal that rests roughly flat on a platform, such as platform 230 of FIG. 3. Frame 510 may have various holes in it, such as window 520. First set of magnets 540 may represent first set of magnets 330 of FIG. 3. First set of magnets 540 may couple with another magnet, or piece of metal, to adjust an angle of a cover support, such as angle 240 of cover support 305 of FIG. 3. First set of magnets 540 may be a set of individual magnets or may be a single magnet with various portions of the magnet obscured by some other material, which may be nonmagnetic, such as nonmagnetic area 545.

Second set of magnets 530, which may include second subset of magnets 530-1 and second subset of magnets 530-2, may represent second set of magnets 340 of FIG. 3. Second set of magnets 530 may allow support base 500 to connect with a platform, such as platform 230 of FIG. 3. Second set of magnets 530 may allow support base 500 to only be placed in certain predefined locations on a platform. Second set of magnets 530 may interact with magnets attached with a platform to attract and repel support base 500 from various locations. Further, second set of magnets 530 may interact with a platform and/or magnets attached with the platform to force support base 500 to remain linearly aligned with the platform and another support base that is part of a support element for supporting the other cover of a book. By forcing support base 500 to remain horizontally aligned with the platform and another support base, a camera may be able to image a book placed on the reprographic copy stand that support base 500 is part of and image pages of the book with little or no skewing of the text and/or pictures in the book.

Figure 6:
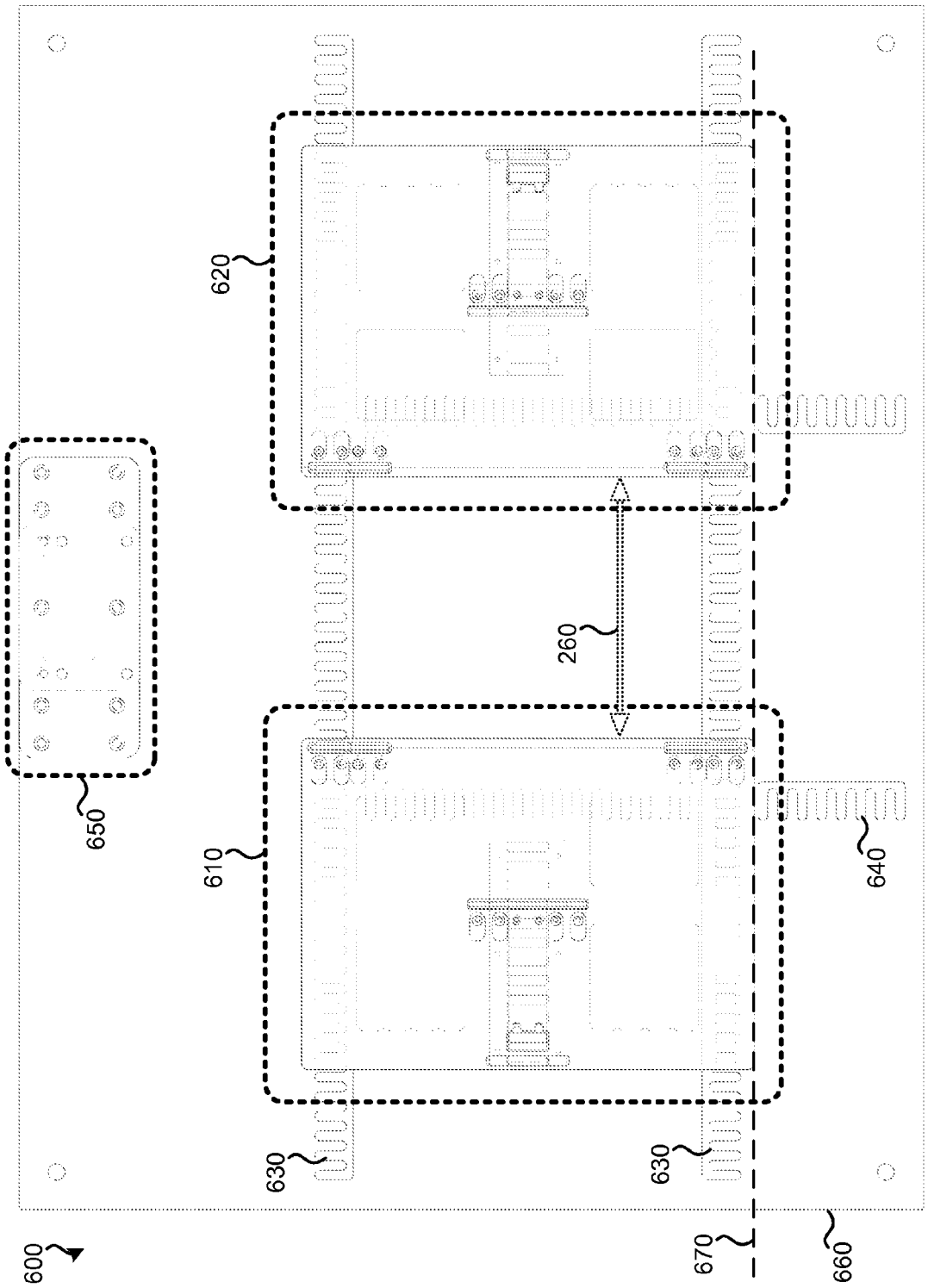
FIG. 6 illustrates an embodiment of a reprographic copy stand viewed from above.

FIG. 6 illustrates an embodiment of a reprographic copy stand 600 viewed from above. Reprographic copy stand 600 may represent reprographic copy stand 400 of FIG. 4, reprographic copy stand 300 of FIG. 3, reprographic copy stand 200 of FIG. 2, or some other reprographic copy stand. Reprographic copy stand 600 may include several components: support element 610, support element 620, horizontal platform magnets 630, vertical platform magnets 640, vertical support 650, and platform 660.

Support element 610 may represent support element 210 of FIGS. 2 and 3. Support element 610 may include a base support, such as base support 500 of FIG. 5. Similarly, support element 620 may represent support element 220 of FIG. 3 and may include a base support, such as base support 500 of FIG. 5.

Platform magnets 630 may couple with the second set of magnets of support elements 610 and 620. Platform magnets 630 may represent a series of individual magnets or a smaller number of magnets that have portions of each magnet obscured. Platform magnets 630 may be located on the top or bottom of platform 660. As support element 610 and support element 620 are coupled with different magnets of platform magnets 630, distance 260 may increase or decrease. Distance 260 may allow for a binding of a book to be supported by platform 660. Dotted line 670 is present to illustrate how when support element 610 and support element 620 are coupled with platform magnets 630, support element 610 and support element 620 are linearly aligned. If an image is captured by a camera attached with vertical support 650, little or no skewing of the image may occur because support element 610 and support element 620 are aligned with each other and aligned with vertical support 650.

Vertical platform magnets 640, which may be a series of small magnets or a smaller number of magnets with portions of each magnet obscured by a nonmagnetic material and may allow for support element 610 and support element 620 to be moved to accommodate books of different sizes.

Figure 7:
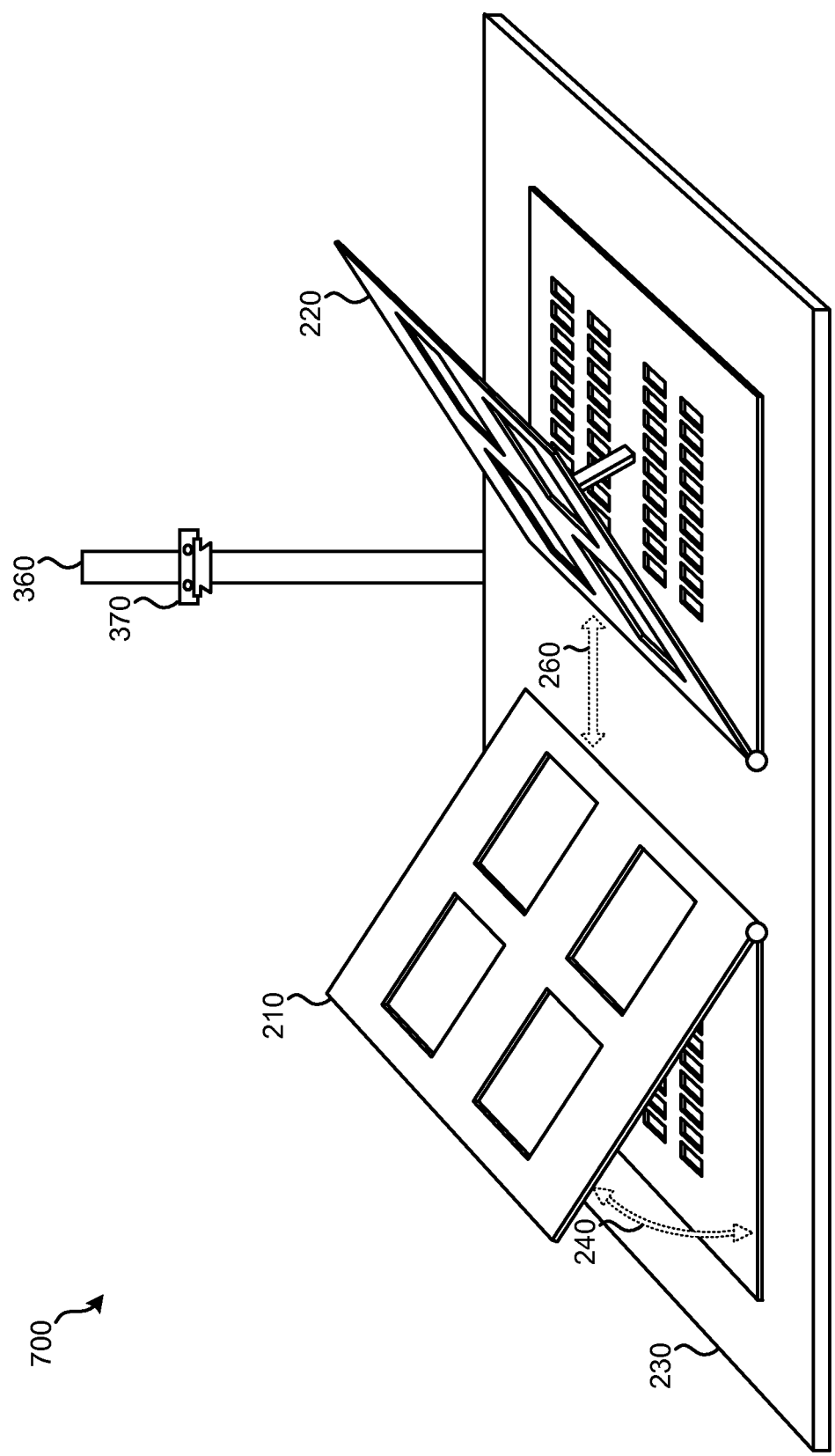
FIG. 7 illustrates an embodiment of a reprographic copy stand viewed from an angle.

FIG. 7 illustrates an embodiment of a reprographic copy stand 700 viewed from an angle. Reprographic copy stand 700 may represent any of the previously described embodiments of reprographic stands. Reprographic stand 700 may include first support element 210, second support element 220, and platform 230. Reprographic stand 700 may also include vertical support 360 and mount 370, which may be connected with a FOVID. The area of platform 230 created by distance 260, represented by a dotted arrow, between first support element 210 and second support element 220 may be used to support the binding of a book. Angle 240, represented by a dotted arrow, may represent the angle that support element 210 is set to support a cover of a book.

Figure 8:
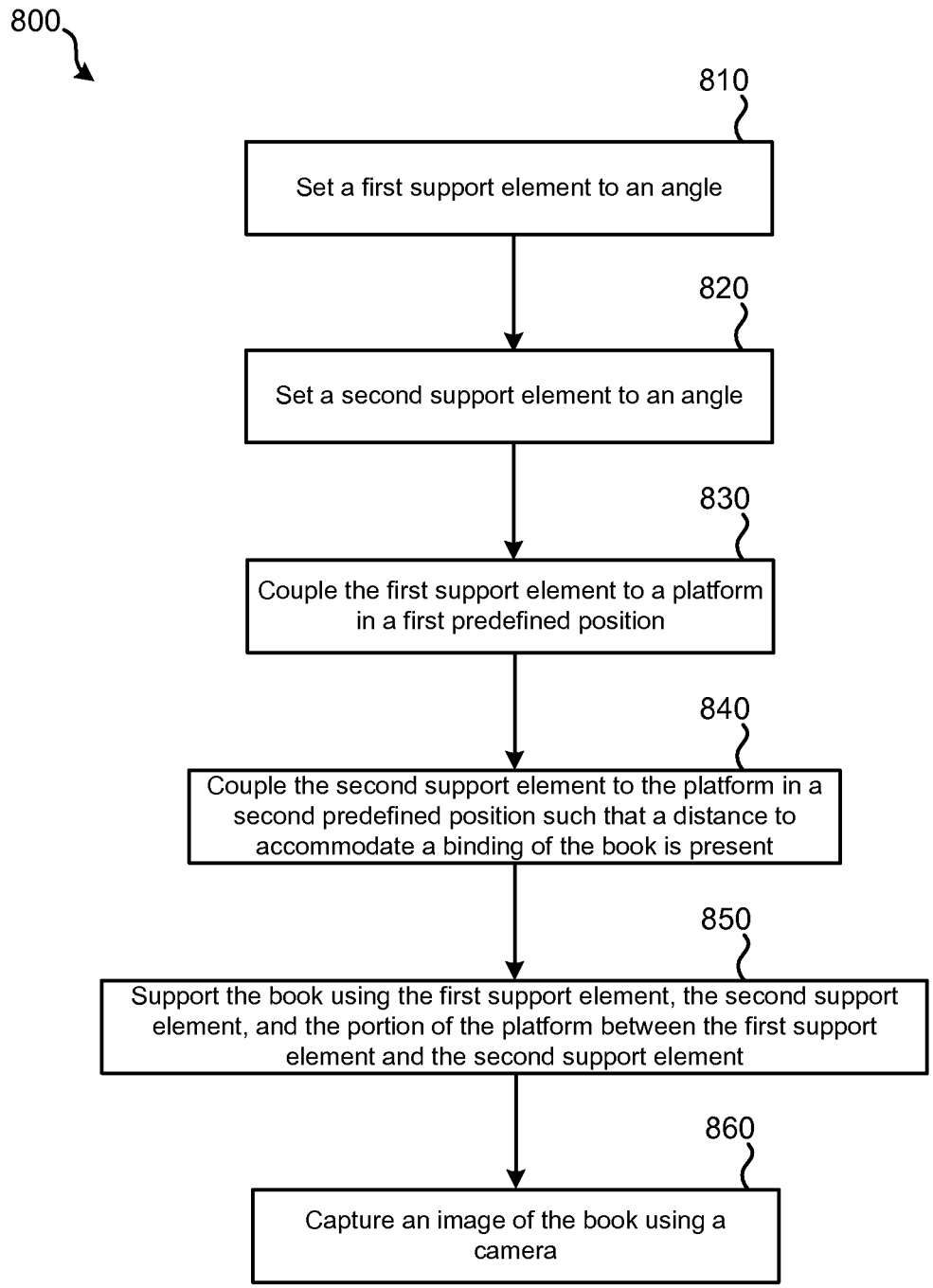
FIG. 8 illustrates an embodiment of a method for imaging a book using a reprographic copy stand.

Reprographic copy stands and their various components described in FIGS. 2-6 may be used to perform various methods. FIG. 8 illustrates an embodiment of a method 800 for imaging a book using a reprographic copy stand. At block 810, an outer support element may be set to an angle desired to support a cover of a book (or whatever the outer page of the book is). This may involve one of a number of predefined angles being selected. At block 820, a second support element may be set to an angle desired to support the other cover of the book (or whatever the other outer page of the book is). The angles set for the first support element and the second support element may have the same magnitude or may have different magnitudes.

At block 830, the first support element may be positioned in a first predefined location on a platform of a reprographic copy stand. The predefined locations on the platform may be defined by one or more magnets that force the first support element to remain in place on the platform at only the predefined locations. At block 840, the second support element may be coupled to the platform at a second predefined position such that a distance between the first support element and the second support element are present. This distance between the first support element and the second support element may allow the binding of a book to rest on the platform of the reprographic copy stand. As with the first support element, the second support element may only be coupled with the platform in predefined locations determined by the magnets of the second support element and the magnets of the platform. These magnets may ensure that the first support element and the second support element are horizontally aligned such that an image taken from a camera or other imaging device from a vertical support will have little or no skewing.

At block 850, a book may be placed on the reprographic copy stand. The first support element may support one cover of the book at a first angle, the second support element may support the other cover of the book at a second angle, and the portion of the platform between the first support element and the second support element may support the binding. As such, the entire bookbinding and each of the corners of the book may be supported.

At block 860, an image of the book (e.g., of one or more pages of the book) may be captured using a camera or other imaging device connected with a mount attached to a vertical support connected with the platform of the reprographic copy stand.

Figure 9:
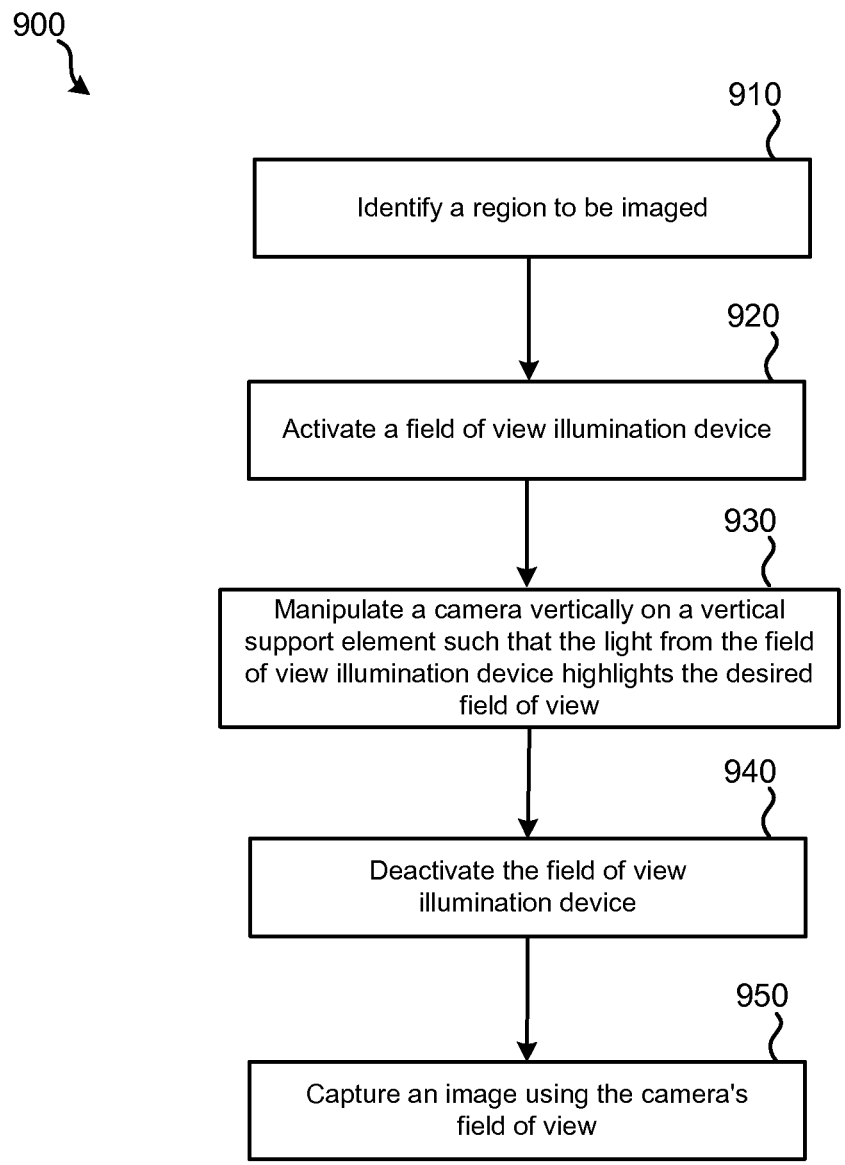
FIG. 9 illustrates an embodiment of a method for adjusting the field of view of a camera and imaging a book.

FIG. 9 illustrates an embodiment of a method for adjusting the field of view of a camera and imaging a book. Reprographic copy stands and their various components described in FIGS. 2-6 may be used to perform method 900. Further, method 900 may be performed in conjunction with method 800 of FIG. 8 or some other method for using a reprographic copy stand.

At block 910, a user, or some device, such as a computer system, may identify a region of a book that is desired to be imaged. This region may be a page of the book, a portion of a page, or a set of two pages. Other regions may also be possible. At block 920, a FOVID may be activated. Activating the FOVID may result in an outline or area of light illuminating a region on a book (if a book is present) on a reprographic copy stand. The FOVID may be attached with a mount which also may be connected with a camera. At block 930, the camera and/or the mount that attaches the camera with a vertical support for the reprographic copy stand may be manipulated vertically such that the area desired to be imaged is illuminated or outlined in light by the FOVID. This vertical manipulation may only need to be done once per book, because each page of a book may have text and/or pictures in the same general area.

At block 940, the FOVID may be deactivated. In some embodiments, the FOVID remains active while images are being captured of the book. At block 950, an image of the book (or page or pages) is captured. This image may correspond approximately to the area defined by the light emitted by the FOVID. As such, a user may not need to look through a viewfinder of the camera to determine whether the page is properly fitting within the camera's field of view.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Further, it should be understood that the term book is intended to encompass other printed materials, such as magazines, pamphlets, or any other form of bound paper.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Further, the preceding description details a reprographic copy stand for the purposes of imaging pages of a book. It should be understood that the reprographic copy stand may be used to hold a book open for other purposes. Further, the embodiments of reprographic copy stands disclosed focus on the use of magnets to maintain the angle the book is held open at and the alignment of support elements. As those with skill in the art will recognize, ways of maintaining alignment and maintaining the book open at an angle that do not use magnets may also be used.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A reprographic copy stand, comprising:
    a first support element configured to support a first cover of a book at a first plurality of angles;
    a second support element configured to support a second cover of the book at a second plurality of angles; and a platform configured to couple with the first support element at a first plurality of positions and the second support element at a second plurality of positions, wherein:
- a distance between the first support element and the second support element is variable according to the position of the first support selected from the first plurality of positions and the position of the second support selected from the second plurality of positions such that a plurality of book binding thicknesses are accommodated by the distance;
- the first support element and the second support element couple with the platform via magnetic coupling, the magnetic coupling comprising a plurality of magnets for coupling the first support element to the platform and coupling the second support element to the platform;
- the plurality of magnets for coupling the first support element and the second support element to the platform cause the first support element to couple with the platform at the first plurality of positions and the second support element to couple with the platform at the second plurality of positions;
- each of the first and second support elements comprises a cover support and a support base for defining the first and second plurality of angles; and
- the plurality of magnets for coupling the first support element to the platform and coupling the second support element to the platform comprise:
- a set of support base magnets on the support base and a set of platform magnets on the platform, wherein the set of support base magnets couple with some of the set of platform magnets and repulse others of the set of platform magnets, in order to define the first plurality of positions and the second plurality of positions at which the platform couples with the first support element and the second support element, and in order to prevent the platform from coupling with the first support element and the second support element at other, prohibited positions.

2. The reprographic copy stand of claim 1, wherein the platform is configured to couple with the first support element and the second support element such that the first support element and second support element linearly align.

3. The reprographic copy stand of claim 1, further comprising:
- a vertical support element that extends vertically away from the platform; and
- a camera mount coupled with the vertical support element such that a camera coupled with the camera mount aims at the platform, wherein:
  - text of a book that is open and supported by the first support element, second support element, and the platform is imaged by the camera such that text in an image is linearly aligned.

4. The reprographic copy stand of claim 1, further comprising:
- a first magnetic angle support configured to support the first support element at the first plurality of angles; and
- a second magnetic angle support configured to support the second support element at the second plurality of angles.

5. The reprographic copy stand of claim 1, wherein when a book is seated on the first support element and the second support element, the book's binding is fully supported by the platform.

6. The reprographic copy stand of claim 1, further comprising a light emitting device coupled with a vertical support element, wherein light projected by the light emitting device defines at least a portion of a field of view of a camera.

7. The reprographic copy stand of claim 1:
- wherein each of the first and second support elements further comprise a hinge connecting the cover support and support base, and a magnetic angle support for determining an angle between the cover support and the support base; and
- wherein the magnetic angle support adjustably couples with a set of angle-defining magnets on the support base to establish a plurality of support positions and thereby define the first plurality of angles and the second plurality of angles.

* * * * *